United States Patent

Wooley

(10) Patent No.: US 9,899,850 B2
(45) Date of Patent: Feb. 20, 2018

(54) VEHICLE BASED PORTABLE CHARGING DEVICE

(71) Applicant: Flextronics AP, LLC, Broomfield, CO (US)

(72) Inventor: George Michael Wooley, Troy, MI (US)

(73) Assignee: FLEXTRONICS AP, LLC, San Jose, CA (US)

( * ) Notice: Subject to any disclaimer, the term of this patent is extended or adjusted under 35 U.S.C. 154(b) by 224 days.

(21) Appl. No.: 14/472,771

(22) Filed: Aug. 29, 2014

(65) Prior Publication Data

US 2016/0064976 A1 Mar. 3, 2016

(51) Int. Cl.
*H02J 7/00* (2006.01)
*H02J 7/14* (2006.01)
*B60R 11/02* (2006.01)
*G06F 1/16* (2006.01)

(52) U.S. Cl.
CPC .......... *H02J 7/0044* (2013.01); *H02J 7/0042* (2013.01); *H02J 7/14* (2013.01); *B60R 11/02* (2013.01); *G06F 1/1632* (2013.01); *H02J 7/0045* (2013.01)

(58) Field of Classification Search
CPC .................................................. H02J 7/0044
USPC ......................................... 320/103, 107, 115
See application file for complete search history.

(56) References Cited

U.S. PATENT DOCUMENTS

| 5,847,545 A | 12/1998 | Chen et al. |
| 2004/0051497 A1* | 3/2004 | Richards .............. H02J 7/0054 320/103 |
| 2007/0126290 A1 | 6/2007 | Jaynes et al. |
| 2007/0247105 A1 | 10/2007 | Krieger et al. |
| 2008/0284371 A1 | 11/2008 | Hsu |
| 2012/0087078 A1* | 4/2012 | Medica ................ H02J 7/0054 361/679.31 |
| 2012/0166697 A1 | 6/2012 | Hu et al. |

FOREIGN PATENT DOCUMENTS

| DE | 102007033162 A1 | 7/2008 |
| WO | 2014089006 A1 | 6/2014 |
| WO | 2014089049 A1 | 6/2014 |

* cited by examiner

*Primary Examiner* — Richard V Muralidar
(74) *Attorney, Agent, or Firm* — Volpe and Koenig, P.C.

(57) ABSTRACT

Described herein is a system which provides a portable and rechargeable device to charge portable devices. The system includes an entertainment hub or similar structure in a vehicle and a portable and rechargeable device which connects with the entertainment hub to charge batteries in the portable and rechargeable device. The entertainment hub is connected to the vehicle power system and has a connection port for holding and powering the portable and rechargeable device. The connection port and the portable and rechargeable device have mated connectors. An ejection button disengages the portable and rechargeable device from the entertainment hub. The portable and rechargeable device has a connector for connecting to and charging a portable device.

12 Claims, 1 Drawing Sheet

VEHICLE BASED PORTABLE CHARGING DEVICE

FIELD OF INVENTION

This application is related to vehicle electronics.

BACKGROUND

The ever increasing use of portable devices, such as mobile phones, tablets and other like devices, requires the need for efficient, reliable and available means for charging such portable devices.

SUMMARY

Described herein is a system which provides a portable and rechargeable device to charge portable devices. The system includes an entertainment hub or similar structure in a vehicle and a portable and rechargeable device which connects with the entertainment hub to charge batteries in the portable and rechargeable device. The entertainment hub is connected to the vehicle power system and has a connection port for holding and powering the portable and rechargeable device. The connection port and the portable and rechargeable device have mated connectors. An ejection button disengages the portable and rechargeable device from the entertainment hub. The portable and rechargeable device has a connector for connecting to and charging a portable device.

DETAILED DESCRIPTION

Figure 1:
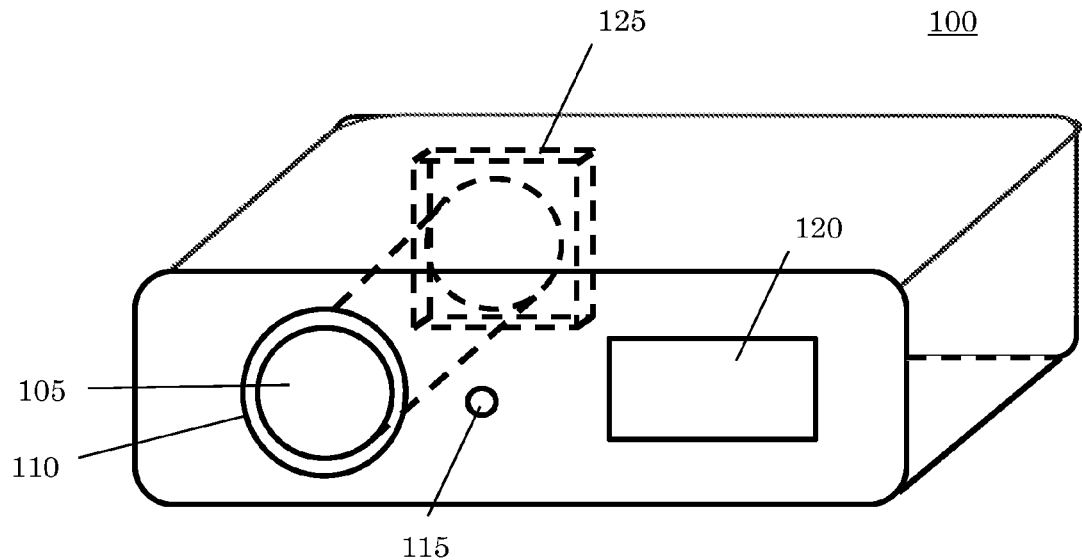
FIG. 1 is an example diagram of an entertainment hub in accordance with an embodiment.

It is to be understood that the figures and descriptions of embodiments of a vehicle based portable charging device have been simplified to illustrate elements that are relevant for a clear understanding, while eliminating, for the purpose of clarity, many other elements found in typical vehicle systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

The non-limiting embodiments described herein are with respect to a vehicle based portable charging device. Other electronic devices, modules and applications may also be used in view of these teachings without deviating from the spirit or scope as described herein. The vehicle based portable charging device may be modified for a variety of applications and uses while remaining within the spirit and scope of the claims. The embodiments and variations described herein, and/or shown in the drawings, are presented by way of example only and are not limiting as to the scope and spirit. The descriptions herein may be applicable to all embodiments of the vehicle based portable charging device although it may be described with respect to a particular embodiment.

The description herein relates to a vehicle based portable charging device and in particular, to an entertainment hub having a connector port connecting to and charging the vehicle based portable charging device. The use of the vehicle and the entertainment hub is illustrative and other areas of the vehicle may be used, other hubs, components or structures may be used, standalone structures may be used, all without deviating from the scope of the description and claims herein.

FIG. 1 is a high level block or schematic diagram of an embodiment of an entertainment hub 100. The entertainment hub 100 includes a connector port 105, a light indicator module 110, an ejection or ejector button 115, and auxiliary peripherals 120. The auxiliary peripherals 120 may be a cigarette lighter, memory/media slot and the like. The connector port 105 has a base 125 that includes an ejector pad and charging contact as shown in greater detail in FIG. 4. The entertainment hub 100 is connected to vehicle power (not shown) via a communication area network (CAN) bus or other like bus arrangement. In another embodiment, the entertainment hub 100 may be a standalone structure that may be powered from a wall outlet or the like.

Figure 2:
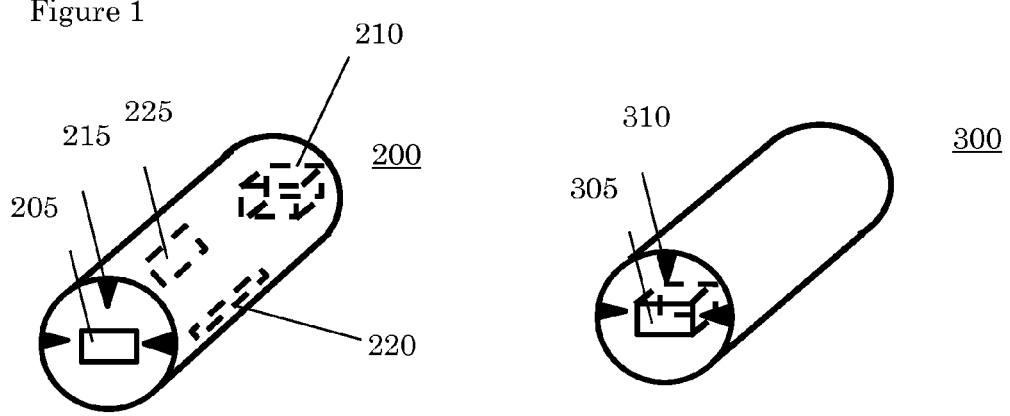
FIG. 2 is a front view of an example diagram of a portable and rechargeable device in accordance with an embodiment.

FIG. 2 is a front view of a portable charging device 200. The portable charging device 200 includes a connector 205 for connecting to a portable device (not shown) and mating connector 210 for connecting to the base 125 of the connector port 105. The portable charging device 200 also includes indicia 215 and insertion guide 220 to properly insert the portable charging device 200 into the connector port 105 of the entertainment hub 100. The portable charging device 200 includes rechargeable batteries or cells 225 that can be recharged using the entertainment hub 100. The rechargeable batteries or cells 225 can be any type of rechargeable battery or cell.

Figure 3:
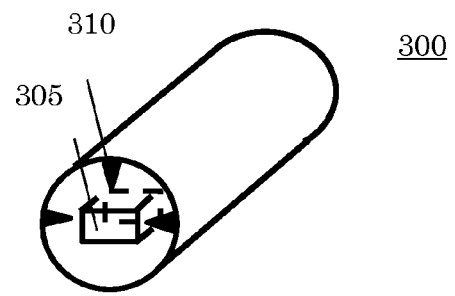
FIG. 3 is a rear view of an example diagram of a portable and rechargeable device in accordance with an embodiment.

FIG. 3 is a rear view of a portable charging device 300. The portable charging device 300 includes a connector 305 for connecting to the base 125. The portable charging device 300 also includes indicia 310 to properly insert the portable charging device 200 into the connector port 105 of the entertainment hub 100.

Figure 4:
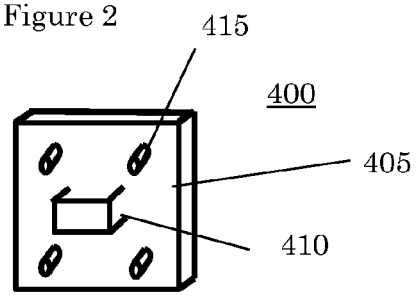
FIG. 4 is an example diagram of a connector in an entertainment hub in accordance with an embodiment.

FIG. 4 is a base 400 that includes an ejector pad 405 and charging contact 410 for connection with a portable charging device. The ejector pad 405 has ejector pins 415 which are connected to an ejector button 115 for ejecting the portable charging device from the entertainment hub 100. The charging contact 410 is connected to a power source (not shown).

Referring to FIGS. 1-4, operationally, a portable charging device, such as portable charging device 200 of FIG. 2, is inserted into the connector port 105 of the entertainment hub 100. The light indicator module 110 lights up to indicate that the portable charging device 200 is properly inserted and connected to the base 125. In particular, that a connector 210 is connected with a charging contact 410. The user can push ejector button 115, which in turn activate or engage the ejector pins 415 to disengage the portable charging device 200 from the charging contact 410.

The use of the term "connector or contact" is meant to include any type of connector or contact mechanism that connects or couples two components together and has power and communication signaling capability. For example, the connector or contact mechanism may be an universal serial bus (USB) or the like. The entertainment hub and the portable connector device may have mating connectors or contacts. The portable connector device will also have a connector mated to connect with the portable device.

The portable connector device may be customized or personalized with colors, brands and the like.

As described herein, the methods described herein are not limited to any particular element(s) that perform(s) any particular function(s) and some steps of the methods presented need not necessarily occur in the order shown. For example, in some cases two or more method steps may occur in a different order or simultaneously. In addition, some steps of the described methods may be optional (even if not explicitly stated to be optional) and, therefore, may be omitted. These and other variations of the methods disclosed herein will be readily apparent, especially in view of the description of the systems described herein, and are considered to be within the full scope of the invention.

Although features and elements are described above in particular combinations, each feature or element can be used alone without the other features and elements or in various combinations with or without other features and elements.

What is claimed is:

1. A charger hub for use in a vehicle, comprising:
   a portable rechargeable device that includes at least one rechargeable battery that is electrically coupled to a first connector and a second connector and the portable rechargeable device provides power from the at least one rechargeable battery to a mobile device using the second connector;
   an electronics hub that includes a front surface and a back surface that is parallel to the front surface, wherein the front surface and the back surface are separated by a thickness;
   a cigarette lighter that is accessible via the front surface of the electronics hub;
   a connector port base formed on the back surface of the electronics hub that includes a base connector, wherein the base connector engages the first connector of the portable rechargeable device and electrically couples a power system of the vehicle to the at least one rechargeable battery; and
   a connector port that connects an opening in the front surface of the electronics hub to the connector port in a direction parallel to the thickness;
   wherein the second connector of the portable rechargeable device is accessible via the opening in the front surface of the electronics hub when the first connector of the portable rechargeable device engages the base connector.

2. The charger hub of claim 1, further comprising:
   an ejection button formed on the front surface, wherein the ejection button disengages the base connector from the first connector and displaces the portable rechargeable device along the thickness causing the portable rechargeable to move through the opening in the front surface.

3. The charger hub of claim 2, wherein the connector base further includes at least one ejection pin mechanically connected to the ejection button.

4. The charger hub of claim 1, wherein the first connector of the portable rechargeable device engages the base connector by using a first charging contact of the first connector mated with a base charging contact on the base connector.

5. The charger hub of claim 1, wherein the portable rechargeable device comprises at least one insertion guide.

6. The charger hub of claim 1, wherein the electronics hub further comprises an illumination module that is coaxially formed with the opening on the front surface, wherein the illumination module illuminates to indicate successful engagement of the portable rechargeable device with the connector port base.

7. An apparatus, comprising:
   a portable charging device that charges a portable device using at least one rechargeable battery, wherein the at least one rechargeable battery is electrically coupled to a first connector and a second connector that connects to the portable device;
   a charging station that includes a front surface and a back surface that is parallel to the front surface, wherein the front surface and the back surface are separated by a thickness; and
   a connector port base formed on the back surface that includes a base connector, wherein the base connector engages the first connector of the portable charging device and electrically couples a power system of a vehicle to the at least one rechargeable battery;
   a cigarette lighter that is accessible via the front surface;
   a connector port that connects an opening in the front surface to the connector port in a direction parallel to the thickness,
   wherein the second connector is accessible via the opening in the front surface when the first connector of the portable charging device engages the base connector.

8. The apparatus of claim 7, further comprising:
   an ejector formed on the front surface, wherein the ejector disengages the base connector from the first connector and displaces the portable charging device along the thickness causing the portable rechargeable to move through the opening in the front surface.

9. The apparatus of claim 8, wherein the connector further includes at least one ejection pin mechanically connected to the ejector.

10. The apparatus of claim 7, wherein the first connector engages the base connector by using a first charging contact of the first connector mated with a base charging contact on the base connector.

11. The apparatus of claim 7, wherein the portable charging device comprises at least one insertion guide.

12. The apparatus of claim 7, wherein the charging station further comprises a lighted indicator that is coaxially formed with the opening on the front surface, wherein the lighted indicator illuminates to indicate successful engagement of the portable charging device with the connector port base.

* * * * *